(12) United States Patent
Barritault et al.

(10) Patent No.: US 12,083,972 B2
(45) Date of Patent: Sep. 10, 2024

(54) VEHICLE STEERING WHEEL

(71) Applicant: Autoliv Development AB, Vargarda (SE)

(72) Inventors: Matthis Barritault, Poitiers (FR);
Sebastien Cassin, Jaunay-Clan (FR);
Thomas Leboeuf, Ouzilly (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/246,624

(22) PCT Filed: Sep. 27, 2021

(86) PCT No.: PCT/EP2021/076430
§ 371 (c)(1),
(2) Date: Mar. 24, 2023

(87) PCT Pub. No.: WO2022/069381
PCT Pub. Date: Apr. 7, 2022

(65) Prior Publication Data
US 2023/0365081 A1    Nov. 16, 2023

(30) Foreign Application Priority Data

Sep. 29, 2020    (FR) ...................................... 2009866

(51) Int. Cl.
*B60R 16/02* (2006.01)
*B60R 16/027* (2006.01)
(Continued)

(52) U.S. Cl.
CPC .............. *B60R 16/027* (2013.01); *B62D 1/04* (2013.01); *B62D 1/06* (2013.01); *B62D 1/08* (2013.01);
(Continued)

(58) Field of Classification Search
CPC . B62D 1/04; B62D 1/046; B62D 1/06; B62D 1/065; B62D 1/08; B62D 1/10;
(Continued)

(56) References Cited

U.S. PATENT DOCUMENTS

| 2,683,996 | A | 7/1954 | Rabe et al. | |
| 6,762,394 | B2 * | 7/2004 | Hobby | B62D 1/065 |
| | | | | 219/202 |

(Continued)

FOREIGN PATENT DOCUMENTS

| CN | 215883789 U | * | 2/2022 |
| DE | 868557 C | | 2/1953 |

(Continued)

*Primary Examiner* — Adam D Rogers
(74) *Attorney, Agent, or Firm* — Thayne and Davis LLC; Matthew D. Thayne

(57) ABSTRACT

A vehicle steering wheel comprising:
a hub,
a movable structure that is able to move with respect to the hub between a driving position and at least one console position,
an articulation arranged between the hub and the movable structure and comprising at least one articulation shaft,
at least one electrical conductor running from the hub to the movable structure,
wherein the articulation shaft comprises a recess so as to form a cable passage, and in which the electrical conductor runs from the hub to the movable structure passing through the cable passage.

13 Claims, 3 Drawing Sheets

(51) Int. Cl.
*B62D 1/04* (2006.01)
*B62D 1/06* (2006.01)
*B62D 1/08* (2006.01)
*B62D 1/183* (2006.01)

(52) U.S. Cl.
CPC .............. *B62D 1/183* (2013.01); *B62D 1/046* (2013.01); *B62D 1/065* (2013.01)

(58) Field of Classification Search
CPC ... B62D 1/183; B60R 16/027; B60Y 2400/83; B60Y 2410/115
See application file for complete search history.

(56) References Cited

U.S. PATENT DOCUMENTS

| | | | |
|---|---|---|---|
| 10,526,002 B2 * | 1/2020 | Schwarz | B62D 1/183 |
| 10,562,558 B1 | 2/2020 | Spahn et al. | |
| 10,710,627 B2 | 7/2020 | Kreutz et al. | |
| 10,974,755 B2 | 4/2021 | Nagasawa | |
| 11,180,177 B1 * | 11/2021 | Aktas | B62D 1/06 |
| 11,198,463 B2 * | 12/2021 | Kwon | B62D 1/06 |
| 11,230,315 B2 * | 1/2022 | Kastelic | B62D 1/08 |
| 2019/0276065 A1 | 9/2019 | Nagasawa | |
| 2019/0291772 A1 | 9/2019 | Kreutz et al. | |
| 2021/0179160 A1 | 6/2021 | Bezeault | |
| 2023/0182801 A1 * | 6/2023 | Leboeuf | B62D 1/10 74/552 |
| 2024/0034388 A1 * | 2/2024 | Barritault | B62D 1/06 |
| 2024/0140517 A1 * | 5/2024 | Barritault | B62D 1/08 |

FOREIGN PATENT DOCUMENTS

| | | | |
|---|---|---|---|
| DE | 202017107359 U1 | 1/2018 | |
| DE | 102017223111 A1 | 6/2019 | |
| DE | 102019134898 A1 * | 6/2021 | ............... B62D 1/04 |
| FR | 3125497 A1 * | 1/2023 | |
| WO | 2018073518 A1 | 4/2018 | |
| WO | WO-2022184722 A1 * | 9/2022 | ............... B62D 1/08 |

* cited by examiner

[Fig. 1]
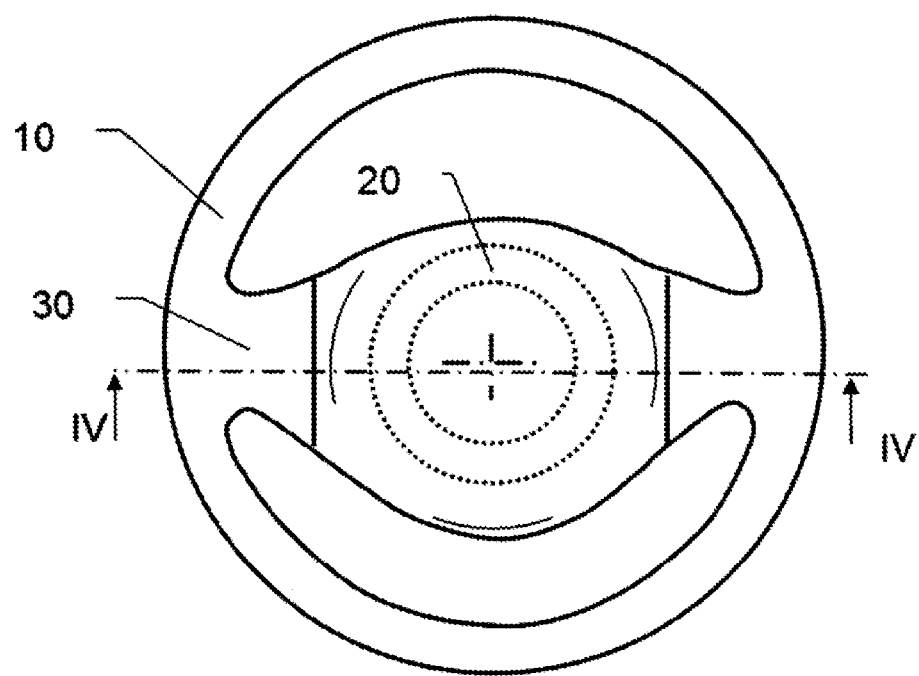
[Fig. 2]
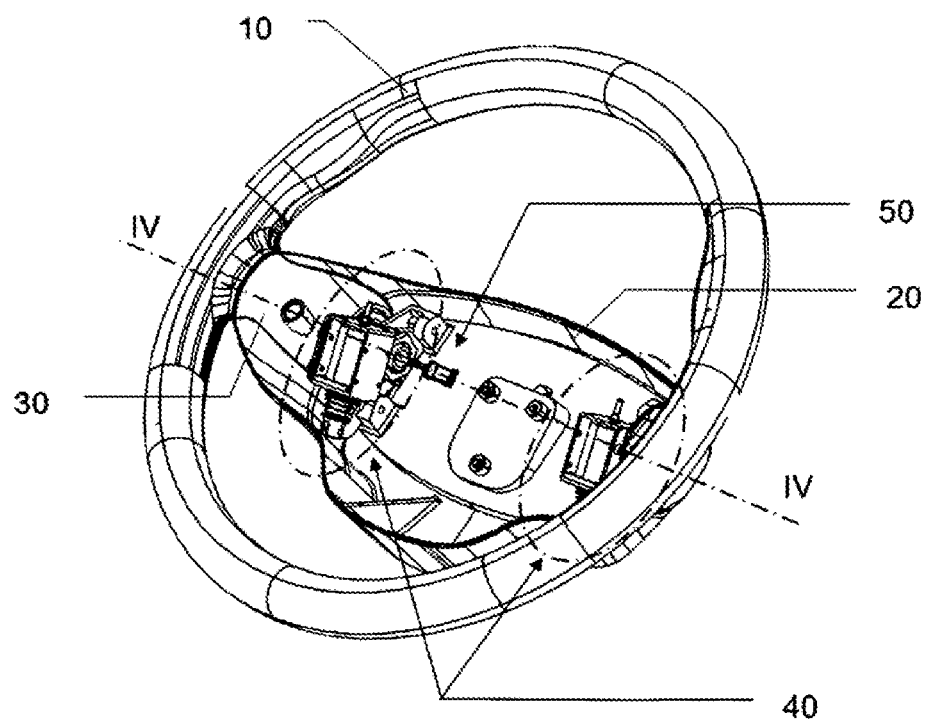

[Fig. 3]
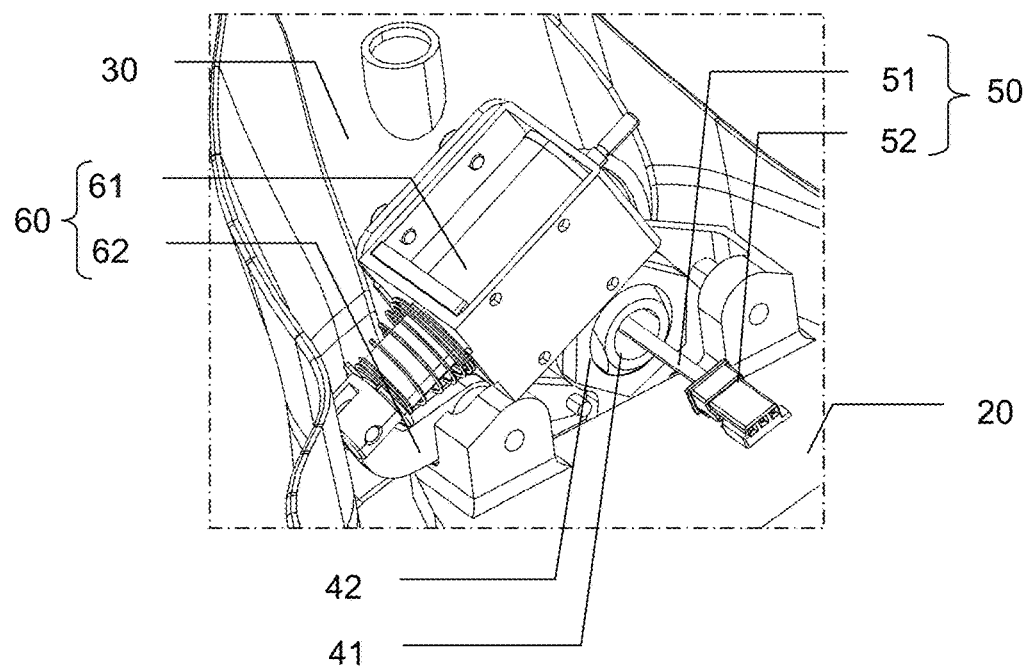
[Fig. 4]
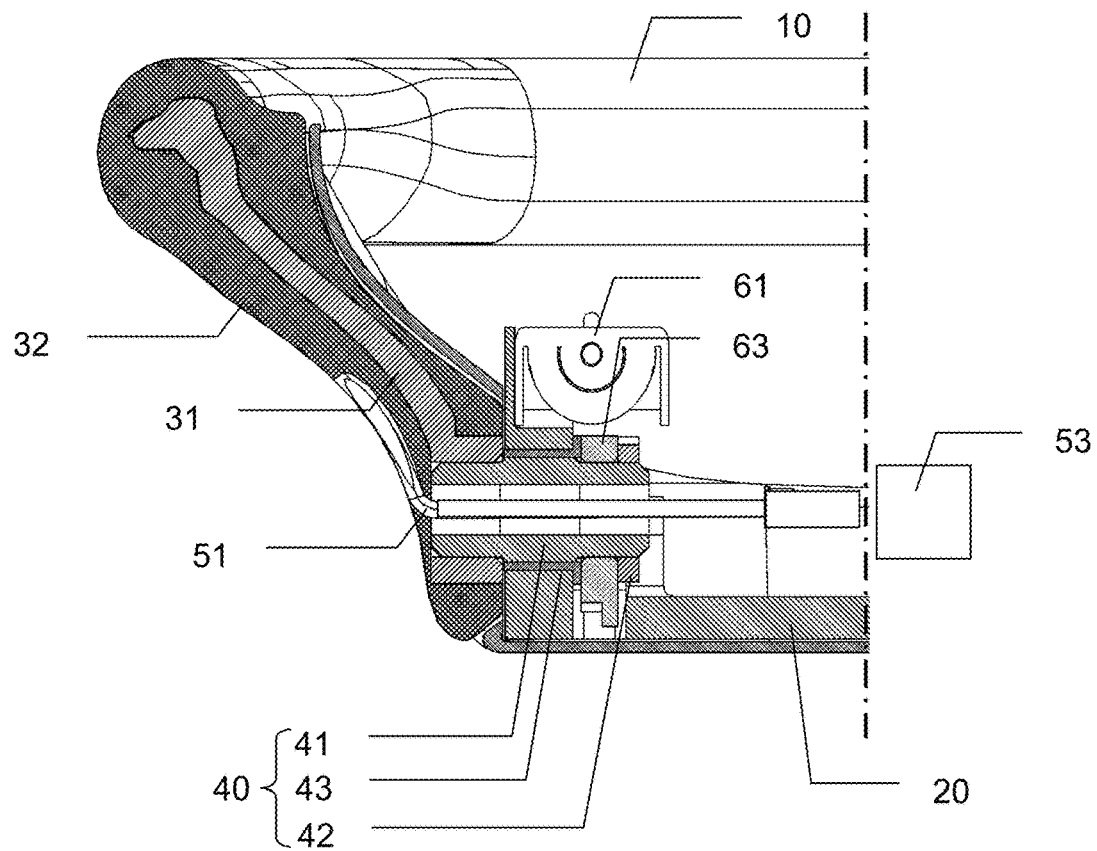

[Fig. 5]
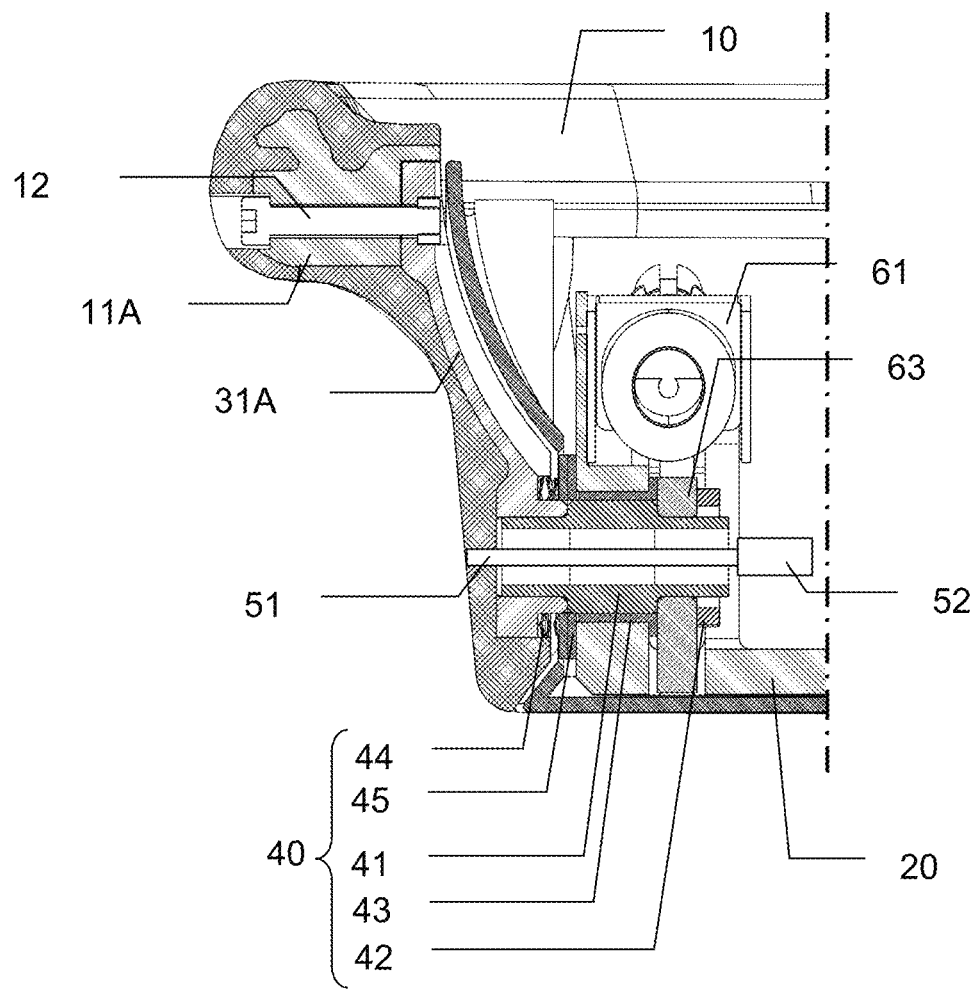

VEHICLE STEERING WHEEL

TECHNICAL FIELD OF THE INVENTION

This invention generally relates to a vehicle steering wheel intended for being mounted on an automotive vehicle.

STATE OF THE ART

It is known in the prior art to propose vehicle steering wheels with articulations, such as document DE202017107359, which discloses a steering wheel, a part of the rim of which can pivot. Document U.S. Ser. No. 10/562,558 discloses a steering wheel with two pivoting rim parts immobilized by a solenoid device. The rim of current steering wheels may comprise several electrical devices and the above documents propose no solution to propose a steering wheel with a robust electrical connection between the hub and a rim or a rim part that is movable with respect to the hub (that is an electrical connection guaranteed regardless of the position of the steering wheel or after a large number of movements of the rim over time).

Document US2019291772A1 discloses a steering wheel articulated with a solid bearing rod which goes from one side to the other of an articulation bearing. No solution is proposed to facilitate or optimize an electrical connection between the rim and the hub of the steering wheel. In particular, no internal access in the joint is proposed towards a hub or a central part of the steering wheel, so that a cable would remain visible and no optimization of the path of the cable would be possible.

DISCLOSURE OF THE INVENTION

One aim of the present invention is to respond to the drawbacks of the documents of the prior art mentioned above and in particular, firstly, to propose a steering wheel with a robust electrical connection between the hub and a rim or a rim part that is movable relative to the hub.

A first aspect of the invention therefore relates to a vehicle steering wheel comprising:
  a hub,
  a movable structure that is able to move with respect to the hub between a first position as a driving position and at least one second position as a console position,
  an articulation arranged between the hub and the movable structure and comprising at least one articulation shaft,
  at least one electrical conductor running from the hub to the movable structure,
characterized in that the articulation shaft comprises a recess so as to form a cable passage, and in which the electrical conductor run from the hub to the movable structure, passing through the passage. The steering wheel according to the above implementation comprises an articulation shaft arranged between the hub and the movable structure which comprises a recess for forming a cable passage. Thus, the electrical conductor can pass through the recess, which guarantees protection of the electrical conductor as well as minimal or low amplitude movements without risk of interference or pinching with the movable parts. Indeed, the recess forms a passage in which the position of the electrical conductor is easy to guarantee. In other words, the articulation shaft comprises a recess so as to form a cable passage arranged to cause the electrical conductor of the hub to run to the movable structure.

According to one implementation, the hub can be arranged to connect the vehicle steering wheel to a vehicle steering system such as a steering column.

According to one implementation, the articulation shaft may comprise a recess over its entire length.

According to one implementation, the articulation shaft may be a hollow shaft, such as a tube or a ring, for example.

According to one implementation, the vehicle steering wheel and/or the articulation may comprise a holding member, arranged to hold the electrical conductor in the recess. It may for example be a nut screwed onto the articulation shaft, the latter being threaded over at least a part of its length.

According to one implementation, the electrical conductor may have one end arranged on the side of the hub comprising a connector, and the connector may have a dimension greater than a dimension of the cable passage. The connector is connected to the electrical conductor while the conductor is already run into the articulation shaft and its recess.

According to one implementation, the steering wheel may comprise a support bore for the articulation shaft arranged to receive the articulation shaft, and the dimension of the connector may be less than the dimension of the support bore of the articulation shaft.

According to one implementation, the articulation shaft may be an added part separate from the movable structure and the hub.

According to one implementation, the vehicle steering wheel may comprise a clearance compensation device arranged at the articulation between the movable structure and the hub.

According to one implementation, the clearance compensation device may comprise a resilient member such as an resilient or even conical washer. A spring may also be considered. The electrical conductor can pass through a central hole of the resilient member.

According to one implementation, the clearance compensation device may be arranged to compensate for a clearance in an axial direction of the articulation shaft.

According to one implementation, the clearance compensation device may be coaxial to the articulation shaft.

According to one implementation, the vehicle steering wheel may comprise a friction reduction device arranged at the articulation between the movable structure and the hub. One (or more) ring(s) may be envisaged, a friction washer, rigidly connected to the articulation shaft and/or the movable structure. The electrical conductor can pass through a central hole of the friction reduction device.

According to one implementation, the friction reduction device may comprise at least one part having a coefficient of friction of less than 0.15, preferably less than 0.10 and even more preferentially less than 0.07, such as a part comprising polytetrafluoroethylene, or bronze.

According to one implementation, the vehicle steering wheel may comprise two coaxial articulations, each with an articulation shaft comprising a recess. Consequently, each articulation can have at least one side arranged towards or in the direction of a central part of the steering wheel. In other words, each articulation can have a face on the side of the hub or of the steering column, so that it is then easy to provide for the electrical conductor to run from the hub toward the face on the side of the hub and then toward the hollow or recessed shaft, to then go toward the rim, while remaining hidden from the user. The path of the electrical conductor is short and optimal in terms of deformations imposed during the movement of the movable structure.

According to one implementation, the electrical conductor can pass through an articulation shaft of one of the two articulations.

According to one implementation, the vehicle steering wheel may comprise a single articulation shaft with a single recess.

According to one implementation, at least one articulation shaft has an opening of the recess facing a central space of the steering wheel, for example an internal space, that is to say the hub or the steering column.

According to one implementation, the steering wheel may comprise one or more cladding parts that cover the path of the electrical conductor, and/or the articulation. Such decorative parts can cover the hub, the lateral or peripheral faces of the hub and therefore of the articulation shaft and the openings of the recess, both toward the hub and towards the rim.

According to one implementation, the movable structure may comprise a reinforced portion. Such a reinforcement forms a carcass or a framework.

According to one implementation, the reinforced portion may comprise at least one rim reinforcement, and/or at least one spoke reinforcement.

According to one implementation, the rim reinforcement can be distinct from the spoke reinforcement.

According to one implementation, the vehicle steering wheel may comprise an electric apparatus or device built into the movable structure, and the electrical conductor has one end arranged on the movable structure side and connected to the electric apparatus or device. The electrical apparatus or device may be a heating, capacitive detection device, a lighting device, etc.

According to one implementation, the movable structure in the driving position can be provided to form a rim essentially comprised in the same plane to provide a practical gripping interface for driving the vehicle. In the simplest example, the rim with the movable structure in the driving position may be a flat circular hoop. However, it is possible to have more complex shapes: an ellipse, a rectangle, a rectangle with rounded corners, simple levers or handles as in formula 1, always generally located in the same plane, or which can be deflected, preferably slightly. However, in the driving position, the rim forms a robust, locked gripping interface and can be gripped by a user to drive the vehicle. It is possible to provide a rim of closed shape (a hoop, an oval, an ellipse) formed in the same plane in the driving position, with only a part that is movable. It is possible to provide a rim of open shape (U-shaped, for example), with only one part that is movable.

According to one implementation, the movable structure in the console position can form a bearing plane for example to place a computer. According to one example, the movable structure may comprise the rim or a rim part that inclines forward when the steering wheel is straight (straight wheels, stationary vehicle or in autonomous driving situation), to clear space and/or place a tablet or computer . . . .

According to one implementation, the movable structure may comprise only a rim part. When the steering wheel is straight (straight wheels in a vehicle with a mechanical steering column), it is possible to provide for example only the upper part is articulated.

According to one implementation, the movable structure may comprise only a rim part and at least one spoke part.

According to one implementation, the steering wheel may comprise the entire rim.

According to one implementation, the movable structure may comprise the entire rim and preferably at least one spoke part.

According to one implementation, the vehicle steering wheel may comprise a cable positioning insert, arranged in the cable passage, between the electrical conductor and the articulation shaft. Such an insert may be provided with resilient or snap fitting for rapid assembly. Such an insert makes it possible to limit or even avoid any contact between the electrical conductor and the articulation shaft.

According to an implementation, the articulation is of the pivot connection type.

A second aspect of the invention relates to a motor vehicle comprising a vehicle steering wheel according to the first aspect.

DESCRIPTION OF THE FIGURES

Other features and advantages of the present invention will become more apparent upon reading the following detailed description of embodiments of the invention, which are provided by way of non-limiting examples and illustrated by the attached drawings, in which:

FIG. 1 shows a general top view of a vehicle steering wheel equipped with a movable structure that can move relative to a hub;

FIG. 2 shows a perspective view showing an internal articulation of the steering wheel of FIG. 1, as well as an electrical conductor;

FIG. 3 shows a detail of the cross-section of FIG. 2;

FIG. 4 shows a cross-section along a plane of FIG. 1 containing the axis IV-IV;

FIG. 5 depicts an alternative implementation of the implementation of FIG. 4.

DETAILED DESCRIPTION OF EMBODIMENT(S)

FIG. 1 shows a vehicle steering wheel comprising a hub 20, a rim 10 and spokes 30 connecting the hub 20 to the rim 10. The steering wheel shown in FIG. 1 comprises a movable structure that can move relative to the hub 20.

In the example shown, the movable structure comprises in particular the rim 10 and a part of the spokes 30, and can pivot relative to the hub 20 about the axis IV-IV, thanks to articulations 40 visible in FIGS. 2 to 4. In FIG. 1, the movable structure is in the driving position; the steering wheel can be used to steer the vehicle. The movable structure can pivot relative to the hub 20 for example to release space in an autonomous driving situation or when the vehicle is stopped, straight wheels, to provide a substantially horizontal surface which can for example receive a computer.

Alternatively, provision may be made for only a part of the rim 10 to be movable, or even several movable parts.

FIG. 2 shows the steering wheel of FIG. 1 in perspective for showing a part of the internal structure. To this end, the external central part of the steering wheel is absent (typically the airbag and its cover have been removed), to show two articulations 40 and an electrical conductor 50.

The articulations 40 provide the connection between the hub 20 and the movable structure (rim 10 and spokes 30) by forming a pivot connection and each comprise an articulation shaft 41 as will be described in FIGS. 3, 4 and 5.

The electrical conductor 50 is typically connected to an electrical Member 53 on board the movable structure (a module for heating 5 the rim 10, light indicators in the rim 10, a capacitive sensor for detecting a presence in the rim 10, control buttons installed on the spokes 30, etc.) and makes it possible to connect this electrical member 53 to the on-board network of the vehicle, via for example a terminal block or a socket installed in or at the hub 20.

It is important to guarantee that the electrical conductor 50 does not risk being pinched, rubbed, worn, cut, etc. during movements of the movable structure relative to the hub 20. For this purpose, it is in particular provided to pass the electrical conductor 50 into a recess of the articulation shaft 41, to provide a cable passage that is housed in an area where the rotational movements of the components have a low amplitude.

For this purpose, FIG. 3 shows a detail of the steering wheel of FIG. 2. The electrical conductor 50 comprises a cable 51 and a connector 52. An actuator 61 is coupled to a control arm 62 to form a locking means 60 of the movable structure (at the lower part of the spoke 30 and the hub 20), and a tightening nut 42 is screwed onto the articulation shaft 41.

The articulation shaft 41 comprises a recess (in this case a through central hole, but it is possible to consider a longitudinal outer groove, for example) which forms a cable passage through the articulation 40. Consequently, the cable 51 of the electrical conductor 50 can pass through the recess to go from the central part of the steering wheel (the hub 20) to the peripheral part (the movable structure: spoke 30 and rim 10).

FIG. 4 shows a partial cross-section of the steering wheel according to a plane normal to FIG. 1 containing the axis of rotation IV-IV.

The articulation 40 mainly comprises the articulation shaft 41, the tightening nut 42 and a sliding ring 43.

The articulation shaft 41 is mounted (for example screwed, inserted or force-fitted) into a frame 31 of the spoke 30 to form a connection allowing the articulation shaft 41 to drive the frame 31 in rotation, for example a connection of the recessed type.

The sliding ring 43 is typically made of a material with a low friction coefficient (polytetrafluoroethylene or PTFE for example) and is mounted on a return wall of the hub 20 in order to limit the friction at the articulation 40.

The tightening nut 42 is screwed onto the articulation shaft 41 in order to sandwich a control plate 63 which interacts with the control arm 62 of FIG. 3.

The articulation shaft 41 is typically provided with a flat or a groove to ensure a rotation stop with the control plate 63, in order to provide effective locking via the kinematic chain connecting it to the actuator 61.

It can be noted in FIG. 4 that the frame 31 of the spoke 30 is shared and/or continuous with the frame of the rim 10, an overmolding 32 forming a continuous and aesthetic covering for the user.

It can therefore be noted that the cable 51 of the electrical conductor 50 starts from the central part of the hub 20 and passes into the recess or central hole of the articulation shaft 41 in order to go directly into the overmolding 32 of the movable structure. Thus, the cable 51 is remote from the other parts of the steering wheel and is protected from vibrations, pinching, interferences, friction which could otherwise be imposed on the electrical conductor 50.

Not shown, it is possible to provide an insert for positioning in the recess of the articulation shaft 41 in order to fasten or attach the cable 51 (by clipping for example) in order to prevent it from moving or moving relative to the articulation shaft 41, or even better protecting the cable 51 from edges which would be present on the articulation shaft 41.

It should also be noted that the connector 52 visible in FIG. 3 has a dimension greater than that of the cable passage in the articulation shaft 41, which prevents it from sliding in the recess or the hole during assembly. The connector 52 can for example be connected to the cable 51 after the insertion of the latter into the articulation shaft 41.

FIG. 5 shows an alternative embodiment relative to the implementation of FIG. 4. The identical parts will not be described again.

In particular, the articulation 40 comprises a clearance compensation device, in the form here of conical and/or resilient washers forming a resilient member 44 placed between the spoke 30 and two sliding washers 45 bearing on the return of the hub 20. Alternatively, a spring may be provided. This makes it possible to limit the risks of clicking, but without imposing strenuous requirements as to the tolerances and manufacturing clearances.

Finally, the frame of the movable structure (spoke 30 and rim 10) is in two parts 31A and 11A, fastened together by a screw 12 (or any other means such as a rivet, a splined pin screwed or force-fitted, etc.)

Such an implementation makes it possible to mount the spokes 30 on the hub 20, each independently of the other, and then attach the rim 10.

Furthermore, it may be noted that the rim 10 is overmolded independently of the spoke 30, but it is possible to provide a single overmolding for the entire frame of the movable structure, as for the implementation of FIG. 4.

It will be understood that various modifications and/or improvements which are obvious for the person skilled in the art may be made to the different embodiments of the invention described in the present description, without departing from the scope of the invention.

The invention claimed is:

1. A vehicle steering wheel comprising:
   a hub;
   a mobile structure that is mobile relative to the hub between a driving position configured to allow a driver to operate the steering wheel and at least one console position in which the mobile structure is moved from the hub relative to the driving position,
   a link arranged between the hub and the mobile structure and comprising at least one link shaft,
   at least one electrical conductor leading from the hub to the mobile structure,
   wherein the link shaft comprises a recess so as to form a cable channel, and wherein the electrical conductor leads from the hub to the mobile structure passing via the cable channel, and wherein the mobile structure is movable relative to the hub about an axis defined by the cable channel.

2. The vehicle steering wheel according to claim 1, wherein the electrical conductor has one end comprising a connector, and wherein the connector has a dimension greater than a dimension of the cable channel.

3. The vehicle steering wheel according to claim 1, wherein the link shaft is discrete from the mobile structure and the hub.

4. The vehicle steering wheel according to claim 1, comprising a clearance compensation device arranged at the link between the mobile structure and the hub.

5. The vehicle steering wheel according to claim 4, wherein the clearance compensation device comprises a resilient member.

6. The vehicle steering wheel according to claim 1, comprising a friction reduction device arranged at the link between the mobile structure and the hub.

7. The vehicle steering wheel according to claim 6, wherein the friction reduction device comprises at least one part having a coefficient of friction of less than 0.15.

8. The vehicle steering wheel according to claim 1, further comprising a second link comprising a second link shaft, wherein the second link shaft comprises a recess forming a cable channel.

9. The vehicle steering wheel according to claim 1, comprising an electric apparatus or device built into the mobile structure, and wherein the electrical conductor has one end connected to the electric apparatus or device.

10. The vehicle steering wheel according to claim 1, wherein the link is of a pivot link type.

11. The vehicle steering wheel according to claim 1 in combination with an automotive vehicle.

12. A vehicle steering wheel comprising:
a hub;
a mobile structure that is mobile relative to the hub between a driving position configured to allow a driver to operate the steering wheel and at least one console position in which the mobile structure is moved from the hub relative to the driving position;
a link arranged between the hub and the mobile structure and comprising at least one link shaft;
at least one electrical conductor leading from the hub to the mobile structure,
wherein the link shaft comprises a recess so as to form a cable channel, and wherein the electrical conductor leads from the hub to the mobile structure passing via the cable channel comprising an electric apparatus or device built into the mobile structure, and wherein the electrical conductor has one end connected to the electric apparatus or device; and
an electric apparatus or device built into the mobile structure, wherein the electrical conductor has one end connected to the electric apparatus or device.

13. A vehicle steering wheel comprising:
a hub;
a mobile structure that is mobile relative to the hub between a driving position configured to allow a driver to operate the steering wheel and at least one console position in which the mobile structure is moved from the hub relative to the driving position;
a link arranged between the hub and the mobile structure and comprising at least one link shaft;
at least one electrical conductor leading from the hub to the mobile structure,
wherein the link shaft comprises a recess so as to form a cable channel, and wherein the electrical conductor leads from the hub to the mobile structure passing via the cable channel comprising an electric apparatus or device built into the mobile structure, and wherein the electrical conductor has one end connected to the electric apparatus or device; and
a second link comprising a second link shaft, wherein the second link shaft comprises a recess forming a cable channel.

* * * * *